US010678852B2

(12) United States Patent
Koukoumidis et al.

(10) Patent No.: US 10,678,852 B2
(45) Date of Patent: *Jun. 9, 2020

(54) CONTENT REACTION ANNOTATIONS

(71) Applicant: Microsoft Technology Licensing, LLC, Redmond, WA (US)

(72) Inventors: Emmanouil Koukoumidis, Bellevue, WA (US); Brian Beckman, Newcastle, WA (US); Nicholas Donald Atkins Lane, Beijing (CN); Arjmand Micheal Samuel, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/628,250

(22) Filed: Jun. 20, 2017

(65) Prior Publication Data
US 2017/0286538 A1     Oct. 5, 2017

Related U.S. Application Data

(63) Continuation of application No. 13/713,240, filed on Dec. 13, 2012, now Pat. No. 9,721,010.

(51) Int. Cl.
*G06F 16/78* (2019.01)
(52) U.S. Cl.
CPC ................... *G06F 16/78* (2019.01)
(58) Field of Classification Search
CPC ........ G06F 16/78; G06F 16/48; G06F 16/907; G06F 16/5866; G06F 16/7867; G06F 17/241; G06F 16/58; G06F 16/68; G06F 16/24573; G06F 16/164; G06F 16/685; G06F 16/686; G06F 17/218;
(Continued)

(56) References Cited

U.S. PATENT DOCUMENTS 6,585,521 B1   7/2003   Obrador
7,106,887 B2   9/2006   Kinjo
(Continued)

OTHER PUBLICATIONS

"Final Rejection Issued in U.S. Appl. No. 13/713,240", dated Jan. 13, 2016, 36 Pages.
(Continued)

*Primary Examiner* — Evan Aspinwall

(57) ABSTRACT

Among other things, one or more techniques and/or systems are provided for annotating content based upon user reaction data and/or for maintaining a searchable content repository. That is, a user may request and/or opt-in for user reaction data to be detected while a user is experiencing content (e.g., watching a movie, walking through a park, interacting with a website, participating on a phone conversation, etc.). Metadata associated with the content may be used to determine when and/or what sensors to use to detect the user reaction data (e.g., metadata specifying an emotional part of a movie). The content may be annotated with a reaction annotation corresponding to the user reaction data, which may be used to organize, search, and/or interact with the content. A search interface may allow users to search for content based upon annotation data and/or aggregated annotation data of one or more users who experienced the content.

20 Claims, 8 Drawing Sheets

(58) Field of Classification Search
CPC .. G06F 16/784; G06F 16/786; G06F 16/9535; G06Q 30/0255; G06Q 30/0269
USPC .......................................................... 707/736
See application file for complete search history.

(56) References Cited

U.S. PATENT DOCUMENTS

| | | | |
|---|---|---|---|
| 7,953,254 | B2 | 5/2011 | Seo |
| 9,721,010 | B2 | 8/2017 | Koukoumidis et al. |
| 2003/0118974 | A1 | 6/2003 | Obrador |
| 2005/0071865 | A1 | 3/2005 | Martins |
| 2007/0150916 | A1 | 6/2007 | Begole et al. |
| 2008/0091512 | A1 | 4/2008 | Marci et al. |
| 2008/0195657 | A1* | 8/2008 | Naaman ............. G06K 9/00677 |
| 2008/0313570 | A1 | 12/2008 | Shamma et al. |
| 2009/0094286 | A1 | 4/2009 | Lee et al. |
| 2010/0070992 | A1 | 3/2010 | Morris et al. |
| 2010/0086204 | A1 | 4/2010 | Lessing |
| 2010/0189358 | A1 | 7/2010 | Kaneda et al. |
| 2010/0251295 | A1 | 9/2010 | Amento et al. |
| 2011/0142413 | A1 | 6/2011 | Kang et al. |
| 2011/0295851 | A1 | 12/2011 | El-Saban et al. |
| 2011/0304629 | A1 | 12/2011 | Winchester |
| 2012/0072939 | A1 | 3/2012 | Crenshaw |
| 2012/0093481 | A1 | 4/2012 | McDowell et al. |
| 2012/0124456 | A1 | 5/2012 | Perez et al. |
| 2012/0203491 | A1 | 8/2012 | Sun et al. |
| 2012/0324491 | A1 | 12/2012 | Bathiche et al. |
| 2012/0324492 | A1 | 12/2012 | Treadwell, III et al. |
| 2012/0324494 | A1 | 12/2012 | Burger et al. |
| 2013/0046761 | A1* | 2/2013 | Soderberg ............. G06Q 10/10 707/736 |
| 2013/0150117 | A1 | 6/2013 | Rodriguez et al. |
| 2014/0089954 | A1 | 3/2014 | Sampathkumaran et al. |
| 2016/0174044 | A1* | 6/2016 | Jones .................... H04W 4/029 455/424 |
| 2016/0246801 | A1* | 8/2016 | Fleischman ............ G06Q 30/02 |

OTHER PUBLICATIONS

"Non Final Rejection Issued in U.S. Appl. No. 13/713,240", dated May 5, 2016, 40 Pages.

"Non Final Rejection Issued in U.S. Appl. No. 13/713,240", dated Nov. 14, 2016, 23 Pages.

"Non Final Rejection Issued in U.S. Appl. No. 13/713,240", dated Jun. 22, 2015, 31 Pages.

"Office Action Issued in European Patent Application No. 13818088.0", dated Jun. 21, 2017, 6 Pages.

"Supplementary Search Report Issued in European Patent Application No. 13818088.0", dated Jul. 11, 2016, 9 Pages.

Darrell, et al., "Correlation and Interpolation Networks for Real-time Expression Analysis Synthesis", In Technical Report 284, MIT Media Lab, Dec. 1995, 8 Pages.

Gong, et al., "Towards Building Mobile Device That Behaves According to Contexts", In Proceedings of 2nd International Conference on Mobile Technology, Applications and Systems, Nov. 15, 2005, 4 Pages.

"International Search Report and Written Opinion of the International Searching Authority Issued in PCT Application No. PCT/US2013/075170", dated Jul. 18, 2014, 10 Pages.

Soleymani, et al., "Affective Characterization of Movie Scenes Based on Multimedia Content Analysis and User's Physiological Emotional Responses", In Proceedings of Tenth IEEE Symposium on International Multimedia, Dec. 15, 2008, 8 Pages.

"Second Office Action Issued in Chinese Patent Application No. 201380065254.5", dated Jan. 3, 2017, 6 Pages.

* cited by examiner

CONTENT REACTION ANNOTATIONS

CROSS-REFERENCE TO RELATED APPLICATIONS

This application is a continuation of U.S. application Ser. No. 13/713,240, now U.S. Pat. No. 9,721,010, filed Dec. 13, 2012 and titled "Content reaction annotations;" the disclosure of which is hereby incorporated herein by reference.

BACKGROUND

Many users may have reactions, such as emotions, while experiencing content. In one example, a user may become upset while experiencing a congested highway. In another example, a user may have a range of emotions, from happy to sad, while experiencing a movie. In another example, a user may become frustrated while installing a new software application. After experiencing content, a user may submit a review of the content. In one example, a user may rate a trip to a state park through a travel website. In another example, a user may write a product review of a washing machine through a shopping website. In this way, users may share their reactions and/or emotions regarding content, such as a movie, a website, music, an application, a geographical location, a business, an image, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for annotating content based upon user reaction data and/or for maintaining a searchable content repository are provided herein. That is, a user may consume (e.g., interact with) a variety of content, such as a movie, music, an application, a website, a geographical location, a business, an image, a book, social network information, an advertisement, a product for sale, a portion of a highway, interaction with a person, an email, and/or a variety of other electronic and/or real-world (e.g., tangible) content. In one example, the user may request and/or opt-in for detection of user reactions to content for various purposes, such as annotating the content based upon how the user reacted to the content. For example, the user may desire to organize, search, and/or share content based upon how the user reacted to the content (e.g., the user may search for images that made the user happy when the user initially created and/or viewed the images). The user may specify a level of security for user reaction data and/or annotations created from the user reaction data (e.g., the user may specify that such information is to be securely stored for use by merely the user, the user may specify that such information may be aggregated with other user reaction data for use by a searchable content repository, etc.).

User reaction data associated with the content and/or a portion thereof (e.g., a segment of a movie, a region of an image, a stretch of highway, morning work emails, evening personal emails, etc.) may be detected. For example, a device (e.g., a mobile phone, a laptop, a tablet device, vehicle instrumentation, a television, an electronic billboard, and/or other devices) may comprise one or more sensors, such as a camera, a motion sensor (e.g., an accelerometer or gyroscope), a GPS device, a microphone, and/or other sensors that may sense user reaction data. In one example, while a user is viewing a first portion of email content on a tablet computing device, one or more sensors may detect a volume of the user's voice, facial expressions of the user, and/or movement of tablet computing device as first user reaction data for the first portion of the email content (e.g., the user may become upset upon reading the first portion of the email content). In one example, one or more user reactions may be collected in real-time (e.g., by one or more sensors), but at least some of these reactions may be processed on a different device and/or at a different time to determine or detect the user reaction data. That is, user reaction data may be determined or detected from a user reaction other than when the user reaction occurred or was captured by one or more sensors, for example (e.g., to conserve resources, enhance processing, etc.). The first portion of the email content may be annotated with a first reaction annotation based upon the first user reaction data. While viewing a second portion of the email content, one or more sensors may detect that the user is crying as second user reaction data for the second portion of the email content. The second portion of the email content may be annotated with a second reaction annotation based upon the second user reaction data, etc.

Various information, such as resource availability (e.g., battery life), metadata associated with a portion of content (e.g., metadata identifying that the portion of content may have a reaction probability of emotion above a threshold), a location context of the tablet computing device (e.g., the user is at home vs. in a work meeting), a context of the content (e.g., the user is reading an email while at home), a current time, and/or other information may be used to selectively activate and/or deactivate one or more sensors. In one example of metadata, offline analysis of movie content may identify one or more portions of the movie content as having relatively high reaction probabilities for invoking emotion (e.g., a car chase scene, a tragic death scene, etc.). Such portions may be annotated with metadata that may identify particular sensors that may be activated during respective portions of the movie, which may mitigate unnecessary resource consumption by sensors during those portions of the movie that may not produce emotion, for example. In this way, content and/or portions thereof may be annotated with reaction annotations that may be used to rate, organize, and/or search for content based upon user reactions.

A searchable content repository comprising annotation data and/or aggregated annotation data of one or more users may be maintained. In one example, the searchable content repository may comprise one or more reaction annotations by a first user for a tragedy movie. In another example, the search content repository may comprise aggregated annotation data derived from annotation data by a plurality of users for a comedy movie. In this way, a search interface may allow a user to search for content or portions thereof based upon user reaction searches (e.g., a search for portions of a movie that made users happy) and/or single user reaction searches (e.g., a search for images that made a particular user happy).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
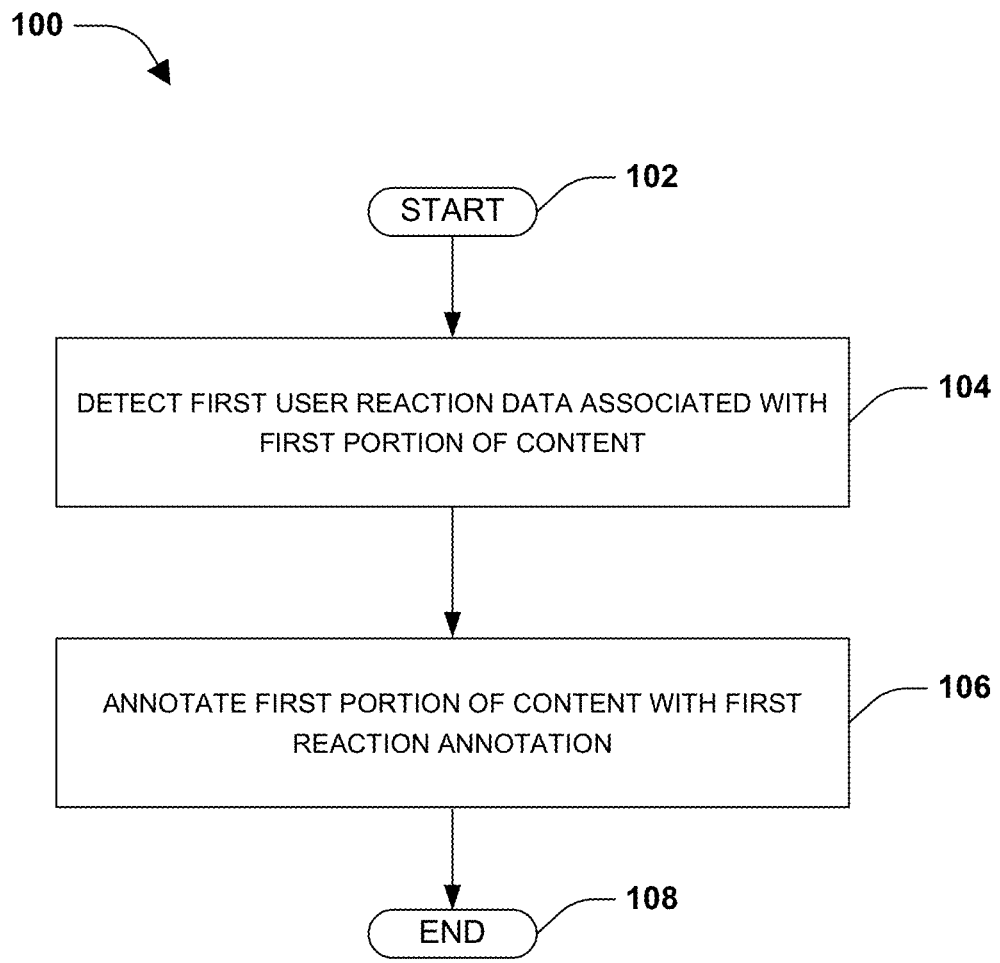
FIG. 1 is a flow diagram illustrating an exemplary method of annotating content based upon user reaction data.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

One embodiment of annotating content based upon user reaction data is illustrated by an exemplary method 100 in FIG. 1. At 102, the method starts. It may be appreciated that in one example, a user may request and/or opt-in for user reaction data to be detected for the purpose of annotating content (e.g., a user may desire to annotation images based upon how the user reacted to the images, so that the user may later search for images based upon what emotions the images invoked in the user, such as a search for happy images). The user may specify a level of privacy for the user reaction data and/or annotation data (e.g., for use by merely the user in organizing and/or searching for content based upon how the user reacted to the content; for use in aggregating annotation data in a searchable content repository available to various users; etc.).

At 104, first user reaction data associated with a first portion of content may be detected. It may be appreciated that content may comprise a wide variety of electronic content, real-world (e.g., tangible) content, and/or experiences, such as a movie, an image, a shopping store, a park, a social network experience, an advertisement, an amusement park ride experience, an email, an individual (e.g., a phone conversation with a boss or friend), a video game, a user interface, and/or a plethora of other types of content. The first reaction data may comprise (e.g., data indicative of) a reaction by a user experiencing the first portion of the content, such as emotional data (e.g., contentment, anger, sadness, frustration, boredom, approval, disapproval, laughter, etc.). In one example, the first reaction data may be detected in real-time during consumption of the first portion of the content by the user. In another example, one or more user reactions may be collected in real-time (e.g., by one or more sensors), but at least some of these reactions may be processed at a different time (e.g., offline) to determine or detect the first reaction data. That is, for example, the first reaction data may be determined or detected from one or more user reactions other than when the one or more user reactions occurred or were captured by one or more sensors on one or more devices. Similarly, processing of one or more user reactions (e.g., to determine or detect user reaction data) may be performed by one or more devices other than the one or more devices that captured the one or more user reactions. By way of example, user reactions such as body movement and/or speaking volume may be captured by a camera and/or speaker on a smart phone and/or tablet device. Because processing these user reactions to determine or detect user reaction data may, among other things, consume resources (e.g., CPU cycles, memory, battery power, etc.), at least some of this processing may be performed on one or more different devices, when the capturing device(s) is plugged in (e.g., as opposed to merely running on battery power), when resource utilization of the capturing device(s) is low (e.g., performing few to no other operations), etc. Detecting or determining user reaction data using a different device(s) and/or other than when user reaction(s) occur or are captured may, for example, allow processing to be performed more efficiently, faster, with less resource utilization, etc. on a capturing device(s) that captured the user reaction(s) and/or on a processing device(s) that processes the user reaction(s), for example.

One or more sensors, such as a camera, a microphone, GPS, a motion sensing device, etc., may be selectively activated or deactivated based upon various information, such as metadata associated with the first portion of the content, a current time, a location context of a device presenting the content, contextual information of the content, etc. In one example, a first sensor may be utilized to detect the first user reaction data based upon metadata associated with the first portion of content. The metadata may specify that the first portion of the content has a reaction probability above a threshold (e.g., offline processing of a movie may indicate that a super hero defeating an enemy may invoke excitement in a user, and thus a relatively high reaction probability may be assigned to such a scene). In another example, a first sensor may be selected from a set of available sensors based upon a resource availability associated with a device presenting the content (e.g., a microphone, but not a camera, of a mobile phone may be selectively activated to detect user reaction during a relatively long experience with a social network). In this way, one or more sensors may be selectively activated to detect user reaction data while experiencing content and/or portions thereof.

At 106, the first portion of the content may be annotated with a first reaction annotation based upon the first user reaction data. For example, a first reaction annotation for a violent portion of a movie may indicate that a user was upset while viewing the violent portion. Because the user may experience more than one emotion while watching the violent portion of the movie, the first portion of the content may be annotated with one or more reaction annotations (e.g., a user reaction annotation indicating that the user became scared and unsettled while viewing the violent portion of the movie).

In one example, the content may comprise more than one portion. For example, a movie may comprise one or more movie segments during which user reaction data may be detected. In this way, second user reaction data associated with a second portion of the content may be detected. The second portion of the content may be annotated based upon the second user reaction data. In another example, the content may be annotated with an overall reaction annotation based upon one or more user reaction data. For example, a comedy movie may receive an overall reaction annotation of bored even though at least one annotation for the comedy movie may comprise a reaction annotation that is different than a bored reaction annotation (e.g., the comedy movie may be annotated with some funny reaction annotations, but may be annotated with a substantially higher number of bored reaction annotations (e.g., that exceed a threshold value) and thus may receive the overall reaction annotation of bored).

User reaction data for the content may be used to generate a user interface that may convey user reaction information about the content. In one example, an overview for the content may be generated. The overview may comprise one or more portions of the content having at least one reaction annotation (e.g., a trailer comprising one or more emotional scenes from a movie). In this way, the overview may provide a user with a general idea (e.g., highlights) of the content. In another example, a graph representing one or more reaction annotations associated with the content may be generated. Differing types of reaction annotations may be visually differentiated within the graph (e.g., based upon color, labels, etc.). For example, a first type of reaction annotation, such as sad, may be visually identified with a first identifier (e.g., colored blue or represented by a frowning face) within the graph. A second type of reaction annotation, such as happy, may be visually identified with a second identifier (e.g., colored yellow or represented by a smiling face) within the graph.

Annotation data associated with the content (e.g., reaction annotations by a plurality of users) may be aggregated to generate aggregated annotation data. The aggregated annotation data may identify how users (e.g., in general) reacted to the content and/or portions thereof. A search interface may allow users to perform reaction searches (e.g., a personalized search for content that a particular user may have reacted to in a certain manner and/or a general search for content that users may have reacted to in a certain manner). For example, in response to receiving a reaction search through the search interface, at least a portion of the content corresponding to the reaction search may be provided based upon the aggregated annotation data (e.g., images that made a user happy; movies that made users scared; etc.). In this way, users may locate content (e.g., movies, images, locations) that may have invoked certain emotions within users. At 108, the method ends.

Figure 2:
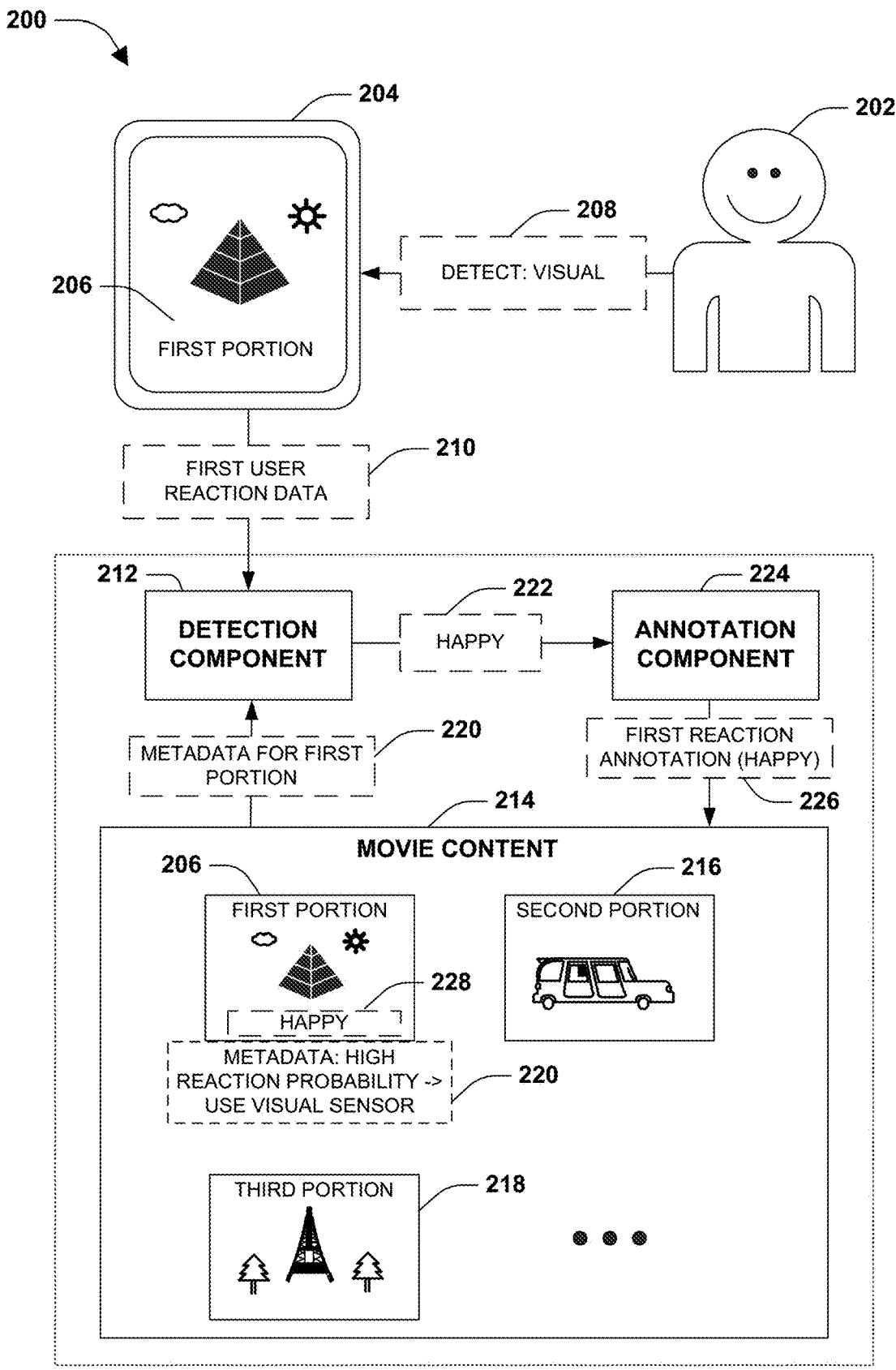
FIG. 2 is a component block diagram illustrating an exemplary system for annotating content based upon user reaction data.

FIG. 2 illustrates an example of a system 200 configured for annotating content based upon user reaction data. The system 200 may comprise a detection component 212 and/or an annotation component 224, which may be associated with a device 204 (e.g., a computing device, a mobile phone, a tablet device, vehicle instrumentation, etc.) of a user 202. The system 200 may comprise an opt-in component and/or the like, not illustrated, configured to activate or deactivate the detection component 212 and/or the annotation component 224 based upon whether the user 202 requests and/or opts-in for detection and/or annotation of content, for example.

The user 202 may experience content, such as movie content 214, through the device 204. The movie content 214 may comprise one or more portions, such as a first portion 206, a second portion 216, a third portion 218, and/or other portions not illustrated. For example, the user 202 may be currently viewing a first portion 206 of the movie content 214. Metadata 220 may be associated with the first portion 206 of the movie content 214. In one example, the metadata 220 may specify that there is a relatively high reaction probability that a user may have a user reaction (e.g., express emotion) to the first portion 206 of the movie content 214. The metadata 220 may specify that a visual sensor is to be used to detect user reaction to the first portion 206 of the movie content 214. In this way, the detection component 212 may utilize a visual sensor of the device 204 to detect 208 first user reaction data 210 (e.g., a happy emotion 222) associated with the first portion 206 of the movie content 214.

The annotation component 224 may be configured to annotate 226 the first portion 206 of the movie content 214 with a first reaction annotation 228 based upon the first user reaction data 210 (e.g., the happy emotion 222). In one example, subsequent user reaction data for the first portion 206 of the movie content 214 may be detected by the detection component 212. In this way, the annotation component 224 may annotate the first portion 206 of the movie content 214 with one or more user reaction annotations. It may be appreciated that the detection component 212 may detect and the annotation component 224 may annotate various types of content, such as music, images, locations, venues, email, people, social network data, articles, books, blogs, etc., and are not limited to merely movie content 214.

Figure 3:
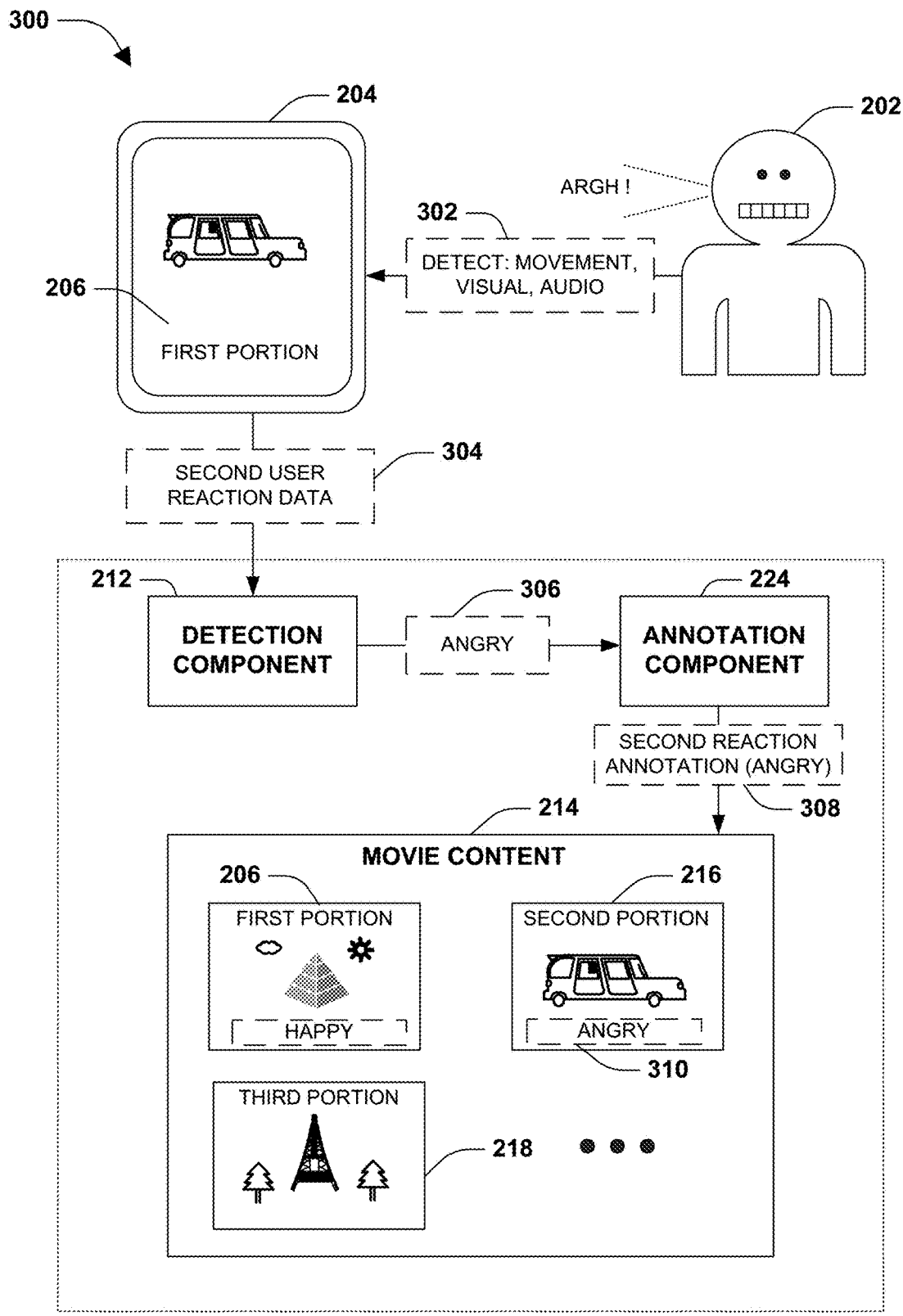
FIG. 3 is a component block diagram illustrating an exemplary system for annotating content based upon user reaction data.

FIG. 3 illustrates an example of a system 300 configured for annotating content based upon user reaction data. The system 300 may comprise an opt-in component and/or the like (not illustrated), a detection component 212, and/or an annotation component 224, which may be associated with a device 204 of a user 202. It may be appreciated that in one example, the system 300 may correspond to the system 200 of FIG. 2. For example, the annotation component 224 may have annotated a first portion 206 of movie content 214 based upon user reaction data (e.g., a happy emotion) associated with the first portion 206 of the movie content 214. The movie content 214 may comprise one or more portions, such as the first portion 206, a second portion 216, a third portion 218, and/or other portions not illustrated.

In one example, the user 202 may be currently viewing the second portion 216 of the movie content 214. The detection component 212 may utilize one or more sensors (e.g., a camera for visual, a microphone for audio, and/or a motion detection device for movement, etc.) to detect 302 second user reaction data 304 (e.g., an angry emotion 306) associated with the second portion 216 of the movie content 214.

The annotation component 224 may be configured to annotate 308 the second portion 216 of the movie content 214 with a second reaction annotation 310 based upon the second user reaction data 304 (e.g., the angry emotion 306). In one example, subsequent user reaction data for the second portion 216 of the movie content 214 may be detected by the detection component 212. In this way, the annotation component 224 may annotate the second portion 216 of the movie content 214 with one or more user reaction annotations. It may be appreciated that the detection component 212 may detect and the annotation component 224 may annotate various types of content, such as music, images, locations, venues, email, people, social network data, etc., and are not limited to merely movie content 214.

Figure 4:
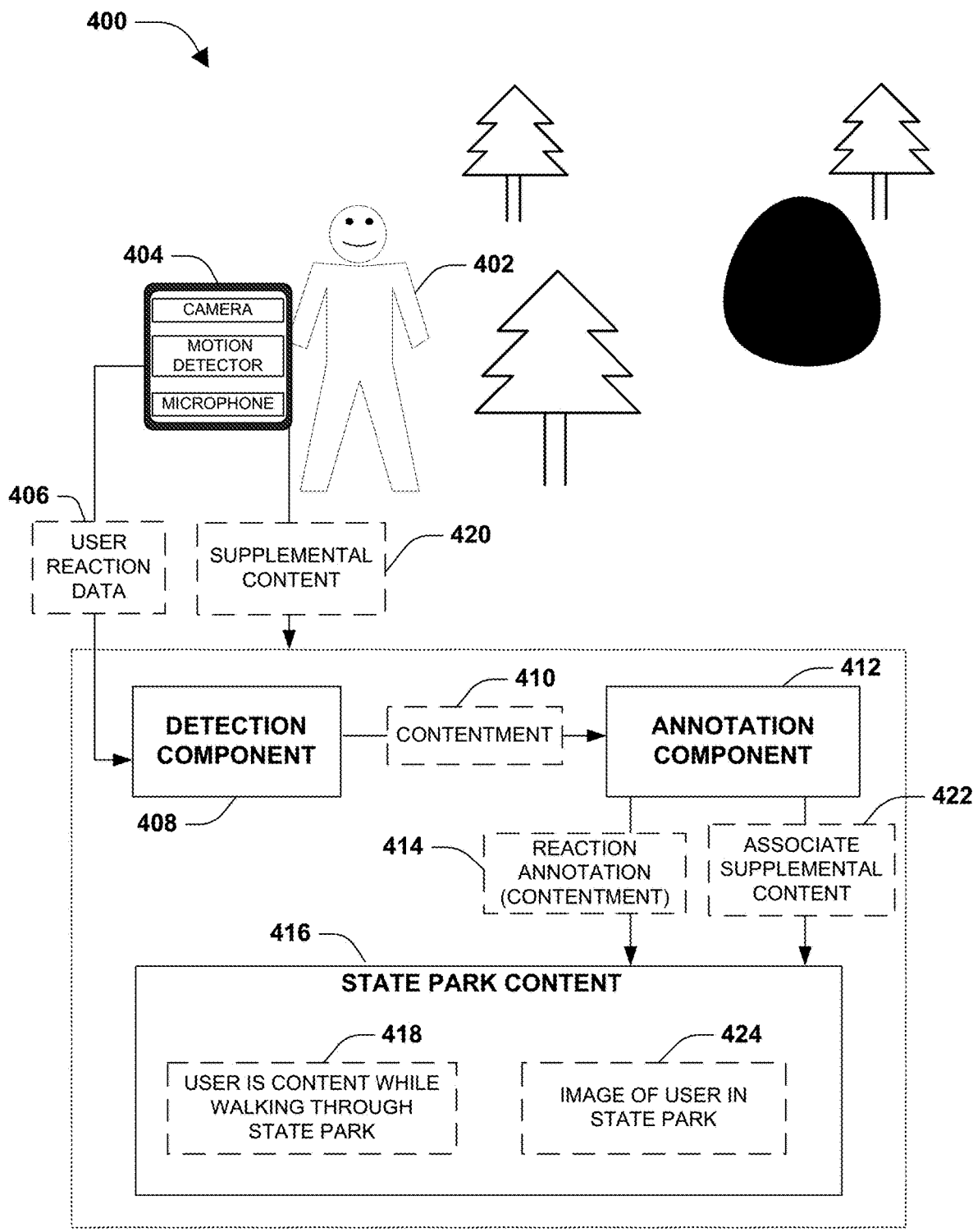
FIG. 4 is a component block diagram illustrating an exemplary system for annotating content based upon user reaction data.

FIG. 4 illustrates an example of a system 400 configured for annotating content based upon user reaction data 406. The system 400 may comprise an opt-in component and/or the like (not illustrated), a detection component 408, and/or an annotation component 412. The detection component 408 may be configured to detect user reaction data 406 associated with content (e.g., state park content 416 representing/identifying a real-world state park). In one example, a user 402 may be exploring a state park. The user 402 may be traveling with a device 404, such as a mobile device (e.g., smart phone, tablet, etc.), while exploring the state park. The device 404 may comprise various sensors, such as a camera, a motion detector, a microphone, and/or other sensors. The detection component 408 may detect user reaction data 406 (e.g., sounds made by the user 402, movement of the user 402, movement of the device 404 by the user, etc.) while the user 402 is exploring the state park. In one example, metadata associated with the state park content 416 (e.g., metadata derived from offline processing of outdoor geographic locations) may indicate when and/or what sensors that the detection component 408 is to activate or deactivate, which may mitigate inefficient use of sensors (e.g., activating all sensors during the entire exploration of the state park may undesirably drain battery resources of the device 404). For example, the metadata may specify that the motion detector and the microphone are to be activated responsive to a determination that the user 402 has entered a particular portion of the state park (e.g., as indicated by a GPS device of the device 404), and that the camera is to be activated when the motion detector determines that the user 402 has stopped moving.

In one example, the detection component 408 may determine that the user reaction data 406 indicates contentment 410 as an emotional state of the user 402. The annotation component 412 may be configured to annotate 414 the state park content 416 with a reaction annotation 418 indicative of the contentment 410 emotional state of the user 402 while exploring the state park. In one example, supplemental content 420 (e.g., associated with the user 402 experiencing the state park content 416) may be obtained through the device 404. For example, the camera of the device 404 may obtain a picture of the user 402 in the state park while expressing contentment 410. The annotation component 412 may associate 422 the supplemental content 420 with the state park content 416 (e.g., as an image 424 of the user 402 in the state park).

In this way, the user 402 and/or other users may organize, search for, and/or interact with the state park content 416 based upon the reaction annotation 418 and/or the supplemental content 420. For example, during a stressful day at work, the user 402 may search through a search interface for content that invoked contentment (e.g., contentment 410) in the user 402. For example, the state park content 416 may be searched to find one or more portions of content (e.g., corresponding to particular portions of the state park) that resulted in contentment (e.g., a particular location in the park that yielded a substantially high level of contentment for one or more users). The search interface may provide a summary describing the state park, an overview (e.g., a video trailer depicting the state park), a graph indicative of user reaction data for the state park content 416, the state park content 416, and/or supplemental content (e.g., the image 424) based upon the search. For example, the search interface may provide a summary of the state park content 412, the image 424 of the user in the state park, and/or other data associated with the state park content 412 (e.g., that may assist the user in visiting a particular aspect of the state park that the user may find soothing).

Figure 5:
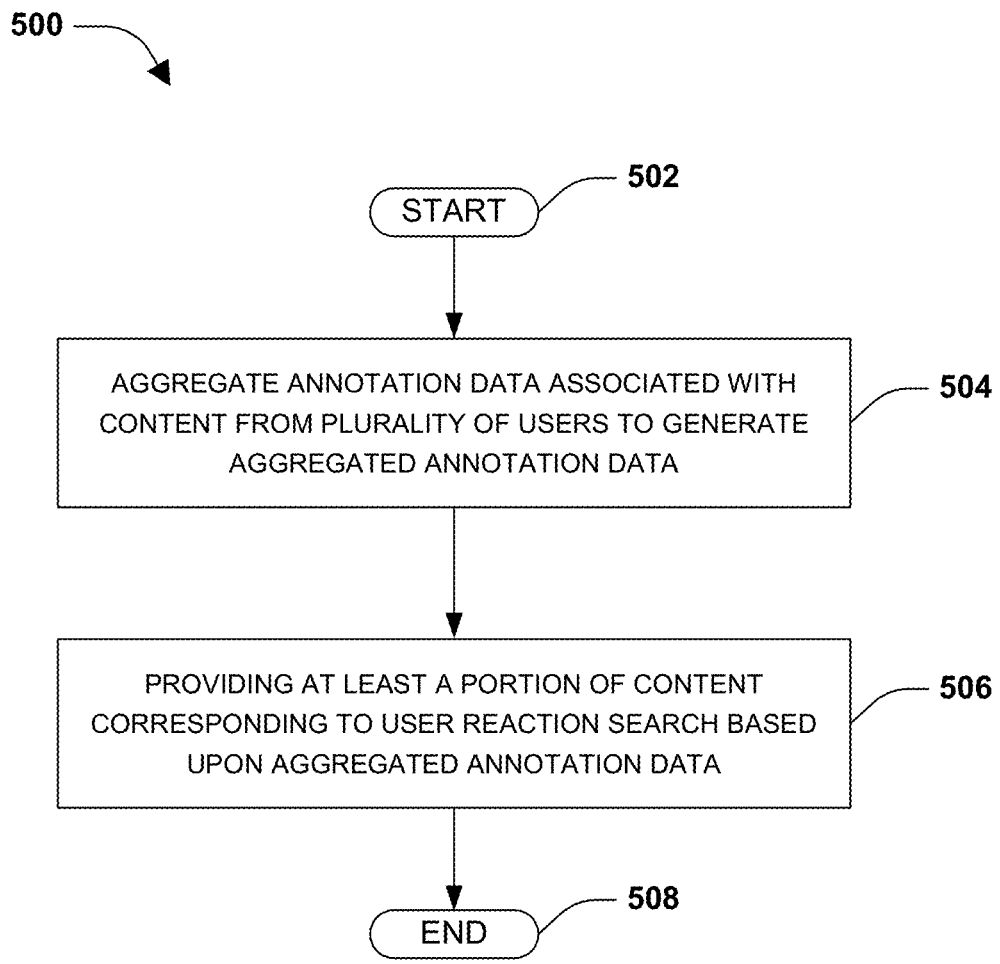
FIG. 5 is a flow diagram illustrating an exemplary method of maintaining a searchable content repository.

One embodiment of maintaining a searchable content repository is illustrated by an exemplary method 500 in FIG. 5. At 502, the method starts. At 504, annotated data associated with content may be aggregated from a plurality of users to generate aggregated annotation data. For example, advertisement content corresponding to an advertisement may be experienced by one or more users. User reaction data may be detected while such users experience the advertisement content (e.g., the advertisement may invoke boredom in a first user, indifference in a second user, boredom in a third user, confusion in a fourth user, etc.). The advertisement content may be annotated with one or more reaction annotations based upon the user reaction data. Annotation data for the advertisement content may comprise such reaction annotations (e.g., boredom, indifference, confusion, etc.). The annotation data may be aggregated to generate aggregated annotation data for the advertisement content (e.g., in general, users are bored by the advertisement).

A search interface may allow users to locate and/or consume content. For example, a user reaction search may be received through the search interface (e.g., during a lecture, a marketing teacher may submit a search for advertisements that invoke boredom in viewers). Accordingly, at least a portion of content that corresponds to the user reaction search may be provided based upon the aggregated annotation data. In another example, a single user reaction search may be received through the search interface (e.g., an advertising manager may search for advertisements that were annotated as boring to the advertising manager). Accordingly, at least a portion of content that corresponds to the single user reaction search may be provided. In this way, a user may search for content based upon aggregated user reactions to the content and/or based upon how the user reacted to the content.

Figure 6:
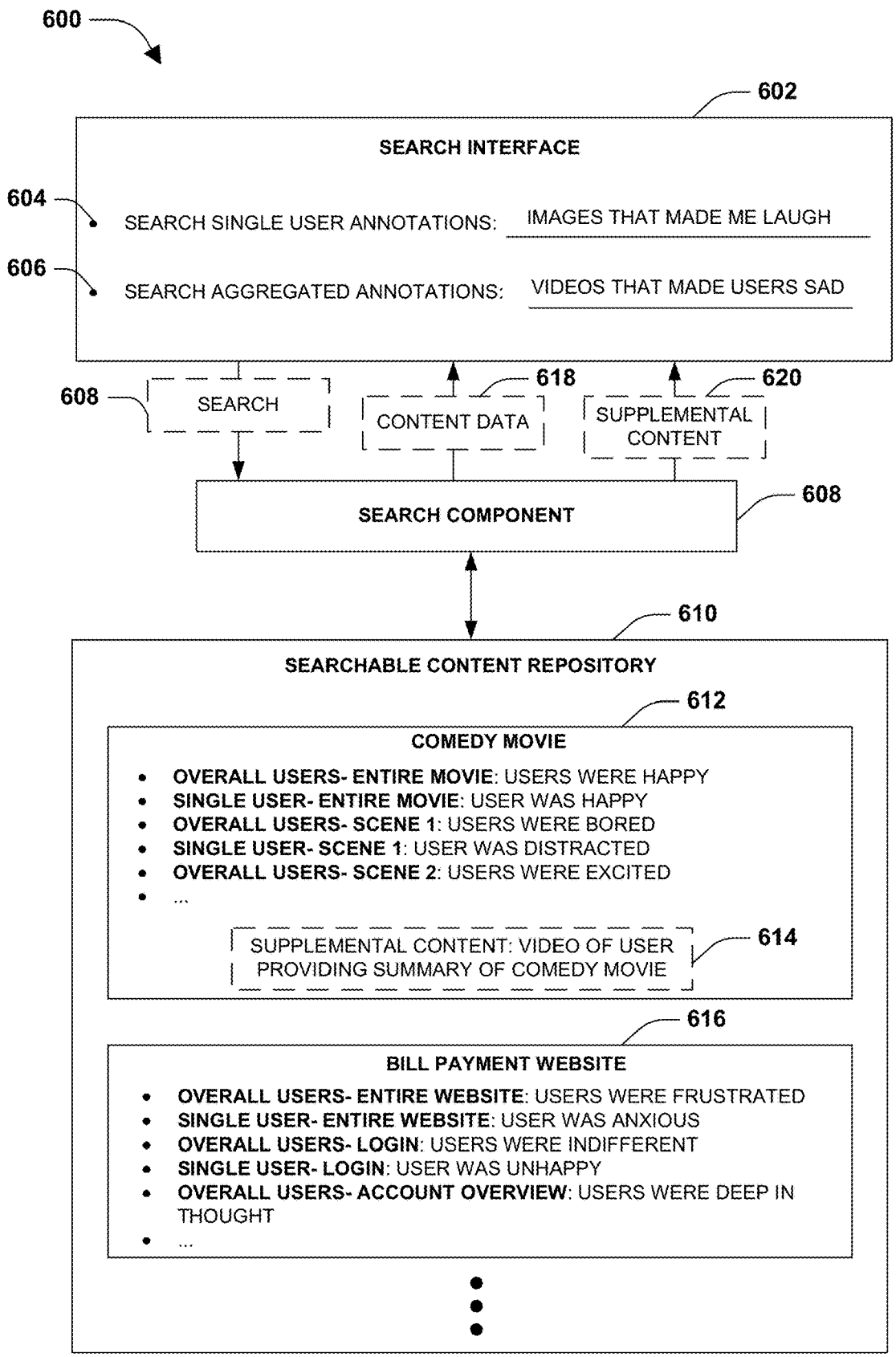
FIG. 6 is a component block diagram illustrating an exemplary system for maintaining a searchable content repository.

FIG. 6 illustrates an example of a system 600 configured for maintaining a searchable content repository 610. The system 600 may comprise a search component 608. The search component 608 may be associated with the searchable content repository 610. The searchable content repository 610 may comprise content that may have been annotated with reaction annotations and/or associated with supplementary content. For example, the searchable content repository 610 may comprise comedy movie content 612, bill payment website content 616, and/or other content not illustrated. In one example, the comedy movie content 612 may be annotated with one or more reaction annotations of a user (e.g., a single user annotation for the entire movie, a single user annotation for a first scene, a single user annotation for a second scene, and/or other single user annotations). The comedy movie content 612 may be associated with aggregated annotation data (e.g., an overall user reaction for the entire movie, an overall user reaction to the first scene, an overall user reaction to the second scene, and/or other aggregated annotations). The comedy movie content 612 may be associated with supplemental content 614. For example, the supplemental content 614 may comprise a video of a user providing a summary of the comedy movie content 612. In this way, the searchable content repository 610 may comprise annotated content that may be retrieved by the search component 608.

The search component 608 may be associated with a search interface 602. The search interface 602 may provide an interface through which users may submit various types of searches. For example, the search interface 602 may provide an interface through which users may submit single user reaction searches by a particular user (e.g., search single user annotations 604, such as a search for images that made a user laugh) and/or submit user reaction searches (e.g., search aggregated annotations 606, such as a search for videos that made users sad). The search component 608 may be configured to receive a search 608 submitted through the search interface 602. The search component 608 may search the searchable content repository 610 for content 618, supplemental content 620, and/or other information (e.g., a summary, an overview, a graph, etc.) corresponding to the search 608. In this way, the search component 608 may present search results based upon information within the searchable content repository (e.g., videos that made users sad, a trailer for a sad movie, user reviews for sad movies, etc.).

Figure 7:
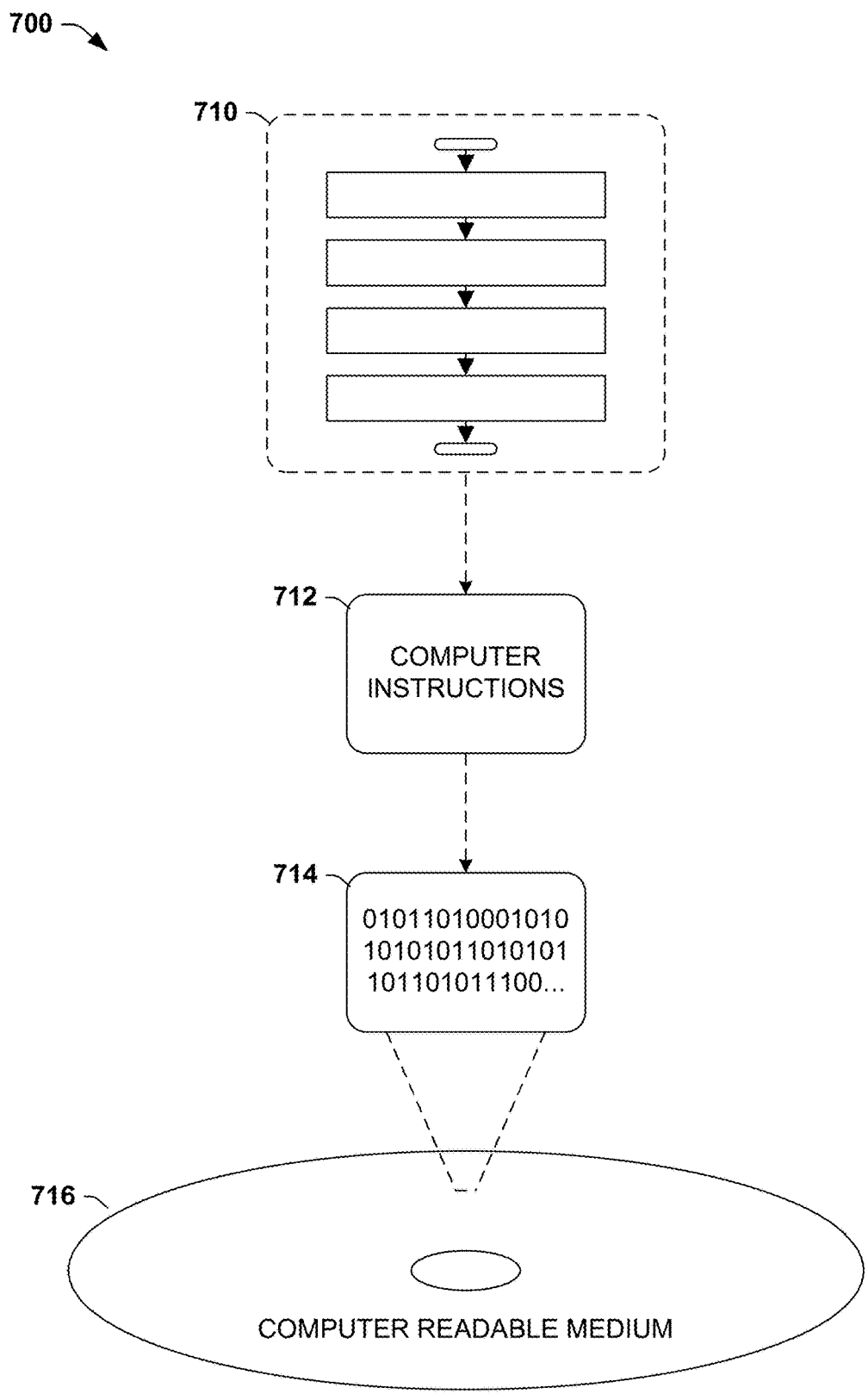
FIG. 7 is an illustration of an exemplary computing device-readable medium wherein processor-executable instructions configured to embody one or more of the provisions set forth herein may be comprised.

Still another embodiment involves a computing device-readable medium comprising processor-executable instructions configured to implement one or more of the techniques presented herein. An exemplary computing device-readable medium that may be devised in these ways is illustrated in FIG. 7, wherein the implementation 700 comprises a computing device-readable medium 716 (e.g., a CD-R, DVD-R, or a platter of a hard disk drive), on which is encoded computing device-readable data 714. This computing device-readable data 714 in turn comprises a set of computing device instructions 712 configured to operate according to one or more of the principles set forth herein. In one such embodiment 700, the processor-executable computing device instructions 712 may be configured to perform a method 710, such as at least some of the exemplary method 100 of FIG. 1 and/or at least some of exemplary method 500 of FIG. 5, for example. In another such embodiment, the processor-executable instructions 712 may be configured to implement a system, such as at least some of the exemplary system 200 of FIG. 2, at least some of the exemplary system 300 of FIG. 3, at least some of the exemplary system 400 of FIG. 4, and/or at least some of the exemplary system 600 of FIG. 6, for example. Many such computing device-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computing device-related entity, either hardware, a combination of hardware and software, software, or software in execution. For example, a component may be, but is not limited to being, a process running on a processor, a processor, an object, an executable, a thread of execution, a program, and/or a computing device. By way of illustration, both an application running on a controller and the controller can be a component. One or more components may reside within a process and/or thread of execution and a component may be localized on one computing device and/or distributed between two or more computing devices.

Furthermore, the claimed subject matter may be implemented as a method, apparatus, or article of manufacture using standard programming and/or engineering techniques to produce software, firmware, hardware, or any combination thereof to control a computing device to implement the disclosed subject matter. The term "article of manufacture" as used herein is intended to encompass a computing device program accessible from any computing device-readable device, carrier, or media. Of course, those skilled in the art will recognize many modifications may be made to this configuration without departing from the scope or spirit of the claimed subject matter.

Figure 8:
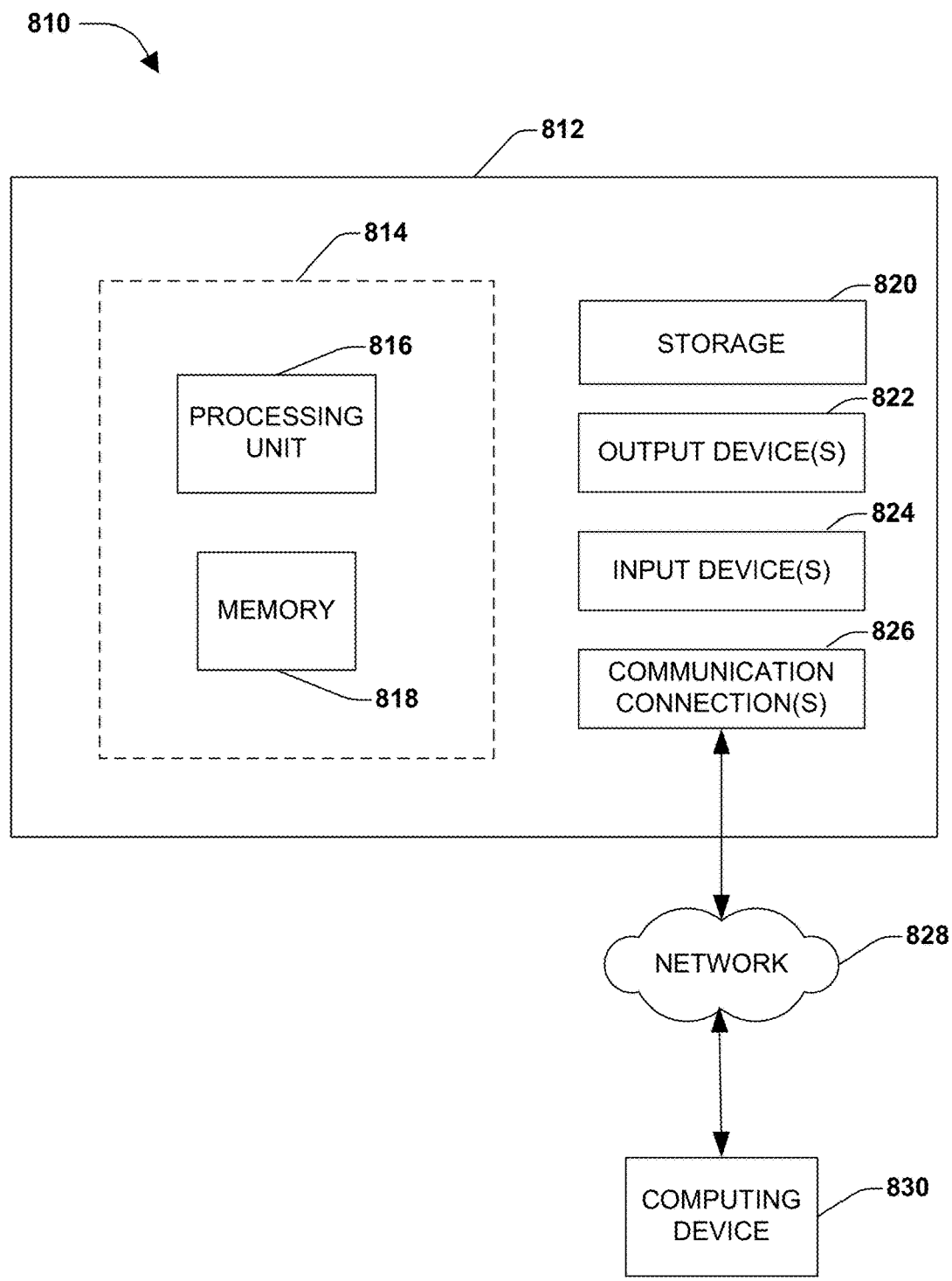
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computing devices, server computing devices, hand-held or laptop devices, mobile devices (such as mobile phones, Personal Digital Assistants (PDAs), media players, and the like), multiprocessor systems, consumer electronics, mini computing devices, mainframe computing devices, distributed computing environments that include any of the above systems or devices, and the like.

Although not required, embodiments are described in the general context of "computing device readable instructions" being executed by one or more computing devices. Computing device readable instructions may be distributed via computing device readable media (discussed below). Computing device readable instructions may be implemented as program modules, such as functions, objects, Application Programming Interfaces (APIs), data structures, and the like, that perform particular tasks or implement particular abstract data types. Typically, the functionality of the computing device readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computing device readable instructions to implement one or more embodiments provided herein may be in storage 820. Storage 820 may also store other computing device readable instructions to implement an operating system, an application program, and the like. Computing device readable instructions may be loaded in memory 818 for execution by processing unit 816, for example.

The term "computing device readable media" as used herein includes computing device storage media. Computing device storage media includes volatile and nonvolatile, removable and non-removable media implemented in any method or technology for storage of information such as computing device readable instructions or other data. Memory 818 and storage 820 are examples of computing device storage media. Computing device storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computing device storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computing device readable media" may include communication media. Communication media typically embodies computing device readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computing device readable instructions may be distributed across a network. For example, a computing device 830 accessible via a network 828 may store computing device readable instructions to implement one or more embodiments provided herein. Computing device 812 may access computing device 830 and download a part or all of the computing device readable instructions for execution. Alternatively, computing device 812 may download pieces of the computing device readable instructions, as needed, or some instructions may be executed at computing device 812 and some at computing device 830.

Various operations of embodiments are provided herein. In one embodiment, one or more of the operations described may constitute computing device readable instructions stored on one or more computing device readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A content annotation method, comprising:
    identifying a portion of content that for which there is a signal of a high probability that a user will experience a reaction to the portion of the content, the signal being derived from data associated with the content;
    determining one or more inputs, from an available set of inputs associated with the content, to activate based on data associated with the portion of the content;
    receiving an input from the available set of inputs based on data associated with the portion of the content;
    receiving, utilizing the received input, data of a user's reaction while experiencing the portion of the content, after the identifying;
    formulating a reaction annotation corresponding to the received data; and annotating the portion of the content with a reaction annotation.

2. The method of claim 1, wherein the receiving is performed only after receipt of an indication to permit detection of data of the user's reaction while experiencing the portion of the content.

3. The method of claim 1, wherein the receiving comprises detecting data in real-time and during consumption of the portion of the content by the user.

4. The method of claim 1, further comprising:
detecting data of another user's reaction while experiencing the portion of content, after the identifying;
aggregating the another user's detected data;
formulating another reaction annotation corresponding to the detected data for the another user's detected data; and
annotating the portion of the content with the another reaction annotation.

5. The method of claim 1, further comprising generating, based at least on the received data, a user interface that by which user reaction data is conveyable.

6. The method of claim 1, wherein the receiving comprises detecting data using one or more sensors of a device presenting the content, based upon a resource availability associated with the device.

7. The method of claim 1, wherein the annotation is a visual element of one of a heatmap and a graph, each depicting one or more reaction annotations associated with the content and in which different types of reaction annotations, when present, are presented in different visual manners.

8. The method of claim 1, wherein the receiving comprises selecting a sensor from an available set of sensors to detect at least some of the data of a user's reaction, the selecting being based upon at least one of a current time, a location context of a device presenting the content, a context of the content, or metadata specifying a type of sensor for the content.

9. The method of claim 8, further comprising selectively activating or deactivating the sensor based upon metadata associated with the portion of the content.

10. The method of claim 1, further comprising generating a graph representing reaction annotations associated with the portion of the content in which different types of the reaction annotations are visually differentiated.

11. The method of claim 10, further comprising:
identifying a first type of reaction annotation with a first visual cue within the graph; and
identifying a second type of reaction annotation with a second visual cue within the graph, wherein the first and second visual cues differ.

12. The method of claim 1, further comprising:
utilizing a sensor to obtain supplemental content associated with an experience of the user with the portion of the content; and
associating the supplemental content with the portion of the content.

13. A content annotation method, comprising:
evaluating data about a media content to yield a determination of whether a portion of the media content has a requisite probability that a user experiencing the portion will have a reaction to it;
receiving, utilizing an activated sensor from a set of available sensors, user reaction data which is associated with a specified portion of the media content when the determination is affirmative, the activated sensor having been activated based on metadata associated with the specified portion of content; and
annotating the specified portion of the media content with a reaction annotation that corresponds to the received user reaction data.

14. The method of claim 13, wherein the reaction annotation also reflects an aggregation of more than one user's detected user reaction data.

15. The method of claim 13, further comprising generating, based at least on the received user reaction data, a user interface that is adapted and configured to convey user reaction data.

16. The method of claim 13, wherein the receiving includes using one or more sensors of a device presenting the media content.

17. The method of claim 16, further comprising selecting the one or more sensors from an available set, based upon a resource availability associated with a device presenting the media content.

18. A content annotation method, comprising:
identifying a portion of content that for which there is an indication of a high probability that a user will experience a reaction to the portion of the content, the indication being in data about the content;
selectively activating a sensor based upon metadata associated with the portion of the content;
detecting, utilizing the activated sensor, data of a user's reaction while experiencing the portion of the content, after the identifying;
formulating a reaction annotation corresponding to the detected data;
receiving an indication limiting use of one or both of the detected data or the reaction annotation; and
annotating the portion of the content with a reaction annotation in a manner consistent with the indication.

19. The method of claim 18, wherein the annotating comprises generating one of a heatmap and a graph, each depicting one or more reaction annotations associated with the portion of the content.

20. The method of claim 19, wherein, in at least one of the heatmap and the graph, different types of the reaction annotations, when present, are visually differentiated.

* * * * *